United States Patent
Wang

(10) Patent No.: US 8,121,199 B2
(45) Date of Patent: Feb. 21, 2012

(54) REDUCING THE BLOCK EFFECT IN VIDEO FILE COMPRESSION

(75) Inventor: Qinghai Wang, Shanghai (CN)

(73) Assignee: Pixelworks, Inc., Portland, OR (US)

( * ) Notice: Subject to any disclaimer, the term of this patent is extended or adjusted under 35 U.S.C. 154(b) by 1550 days.

(21) Appl. No.: 11/534,557

(22) Filed: Sep. 22, 2006

(65) Prior Publication Data

US 2007/0071108 A1 Mar. 29, 2007

(51) Int. Cl.
*H04N 7/12* (2006.01)
*H04N 11/02* (2006.01)

(52) U.S. Cl. .............................. 375/240.29; 375/240.27

(58) Field of Classification Search . 375/240.01–240.29
See application file for complete search history.

(56) References Cited

U.S. PATENT DOCUMENTS

| 5,282,255 A * | 1/1994 | Bovik et al. ................... 382/239 |
| 5,844,614 A * | 12/1998 | Chong et al. ............. 375/240.24 |
| 2003/0103680 A1* | 6/2003 | Westerman ................... 382/268 |

* cited by examiner

*Primary Examiner* — David Czekaj
(74) *Attorney, Agent, or Firm* — Marger Johnson & McCollom, P.C.

(57) ABSTRACT

We describe a method for reducing the block effect in video file compression including inspecting an image in a row and column direction, calculating an intensity vector of the block effect responsive to the inspecting, obtaining distribution data for the block effect responsive to the intensity vector, determining position information of the block effect responsive to the distribution data, and filtering the image responsive to the intensity vector and the position information.

7 Claims, 2 Drawing Sheets

REDUCING THE BLOCK EFFECT IN VIDEO FILE COMPRESSION

This application claims priority from Chinese patent application no. 2005 10029936.8 filed on Sep. 23, 2005, in the Chinese Intellectual Property Office, the disclosure of which we incorporate by reference.

FIELD

The present invention relates to video file compression and, more particularly, to reducing the block effect in video file compression due to error introduced during coefficient quantification of the discrete cosine transform.

BACKGROUND

Many video compression file coding standards exist, including the Motion Picture Experts Group (MPEG) MPEG1 standard for video cassette recorders (VCD) and MPEG2 standard for digital video disks (DVD), the International Telecommunications Union (ITU) H.261, H.263, and H.263+ standards, and the H.264/MPEG4 AVC standard jointly developed by the MPEG and ITU organizations. Another coding standard is the Joint Photographic Motion Group (JPEG) motion JPEG standard. Many of these standards code the source image by first decomposing the source image into small image blocks, e.g., 8×8 or 4×4 blocks, apply a Discrete Cosine Transform (DCT) to the image blocks, and quantify transfer coefficients. This process often involves quantifying noise and transferring error bits that occur during the DCT application to the image blocks.

During the quantification of DCT transfer coefficients, the process abandons many near-zero high frequency coefficients. Quantification, thus, causes precision loss termed quantifying effect. The quantifying effect causes noise that is proportional to the quantifying step: the larger the step, the larger the noise.

And the transfer or transmission of error bits associated with quantifying noise results in a large energy difference between error ridden and adjacent non error ridden DCT blocks. The adjacent non error ridden DCT blocks will have larger phase steps that adversely impact image quality. We collectively refer to the abandonment of near zero coefficients and the transfer of error bits associated with quantifying noise as DCT coefficient error or block effect.

Image compression typically includes decoding a, zooming b, trimming c, and hindering d, as is shown in FIG. 1. Reducing the block effect often occurs during or after decoding a. Many have described reducing the block effect including Liu and Bovik in *Efficient DCT-domain Blind Measurement and Reduction Of Blocking Antifacts*, G. A. Triantafyllidis and others in *Blockness Detection in Compressed Data*, Wesley F. Miaw in *Implementation of Real-Time Software-only Image Smoothing Filter for a Block-transform Video Codec*, and K. Ramkishor in *A Simple and Efficient Deblocking Algorithm for Low Bit-Rate Video Coding*.

Reducing the block effect using these and other current methods that occur during or after decoding may be improved. This is because the decoded image in many systems, including televisions and computer monitors, perform zooming, trimming, and hindering after decoding and thus, after reducing, that may adversely impact the effectiveness of reducing the block effect. And all current methods for reducing the block effect adopt low pass filter to filter, ignoring the different features of the block effect in textural and smoothing regions. In smoothing regions of decoded video images, DCT coefficient errors introduce a phase step along the borders of adjacent blocks. High frequency information in the smoothing region is insufficient to make the phase step small, but the human eye is sensitive enough to detect changes in the smoothing region. In the textural regions of decoded video images where plentiful high frequency information exists, the quantifying error is larger. Even though the error is large, the human eye is insensitive to the high frequency noise and thus, insensitive to the block effect in textural regions. Reducing the block effect may be improved because current methods do not independently adjust filtering according to the human eye's sensitivity to smoothing regions and insensitivity to textural regions to thereby improve image quality.

SUMMARY

We describe a method for reducing the block effect that aims to improve image quality while preserving the image's features and details. The method controls filtering intensity by identifying certain image characteristics, e.g., whether the block effect is present in a smoothing or textural region.

We describe a method for reducing the block effect that includes inspecting an image in a row and column direction, calculating an intensity vector of the block effect responsive to the inspecting, obtaining distribution data for the block effect responsive to the intensity vector, determining position information of the block effect responsive to the distribution data, and filtering the image responsive to the intensity vector and the position information.

We describe some example embodiments with reference to the following drawings.

BRIEF DRAWINGS DESCRIPTION

DETAILED DESCRIPTION

We describe a method for reducing the block effect that includes receiving an image in a row and column direction, inspecting the intensity of the block effect, calculating the distribution status for the block effect, and adapting the filtering according to the inspecting and calculating. And we describe a method for reducing the block effect in single frame still images and serial frame images compacted after decoding.

Figure 1:
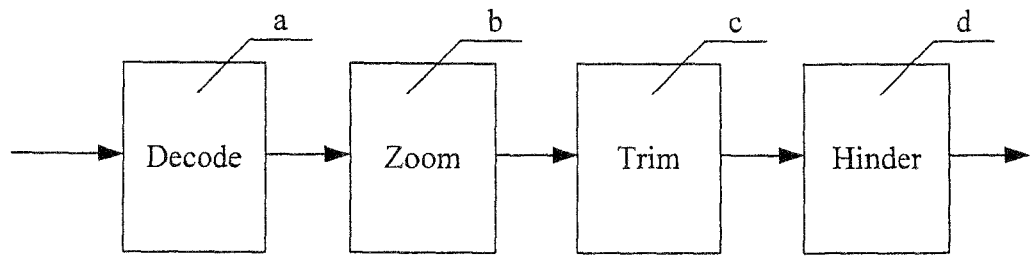
FIG. 1 is a flow chart illustrating an example video compression method.
Figure 2:
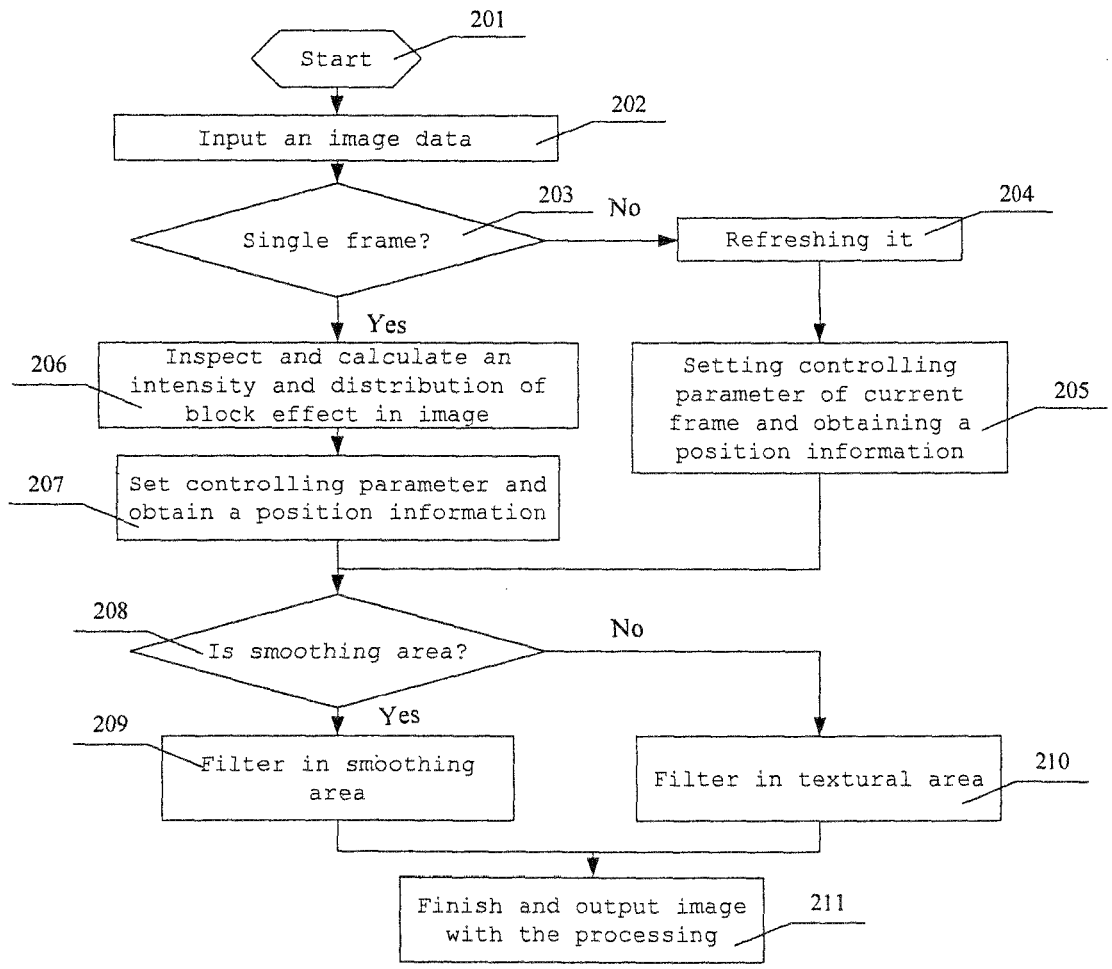
FIG. 2 is a flow chart illustrating an example method for reducing the block effect.

FIG. 2 is a flow chart illustrating an exemplary method for reducing the block effect. At 201, the method sets the upper and lower limits of the reference threshold for determining the block effect and refreshes the intensity vector for determining the block effect in serial images. A person of reasonable skill in the art should recognize that the setting of upper and lower limits for the reference threshold as well as the refreshing of the intensity vector may occur manually, automatically, or in any other known manner.

At 202, the method receives image data provided at an input.

At 203, the method determines whether the image includes a single frame.

If the method determines the image includes a single frame, it inspects and calculates an intensity vector to obtain block effect distribution data at 206. At 207, the method sets the intensity vector $V_N$ to a controlling parameter for filtering and obtains position information according to the block effect distribution data.

If the method alternatively determines the image includes a series of frames, it obtains the intensity vector of the previous frame $V_{N-1}$ at 204 and calculates the intensity vector $V_N$ of the current frame according to $V_N=(1-\alpha)\times V_N+\alpha\times V_{N-1}$ and concurrently inspects and calculates the distribution data of the intensity vector $V_N$, where α is a parameter representative of the filtering request. At 205, the method sets the intensity vector $V_N$ of the current frame to a controlling parameter for filtering and obtains position information according to the block effect distribution data.

At 208, the method determines whether the area is a smoothing region by analyzing the position information and marks the area. If the area is a smoothing region, the method filters the image according to the controlling parameter and the position and area information at 209. If the area is not a smoothing region, the method treats the area as a textural region and filters the image accordingly using the controlling parameter and the position and area information at 210.

At 211, the method completes filtering the block effect and produces the filtered image at an output.

Figure 3:
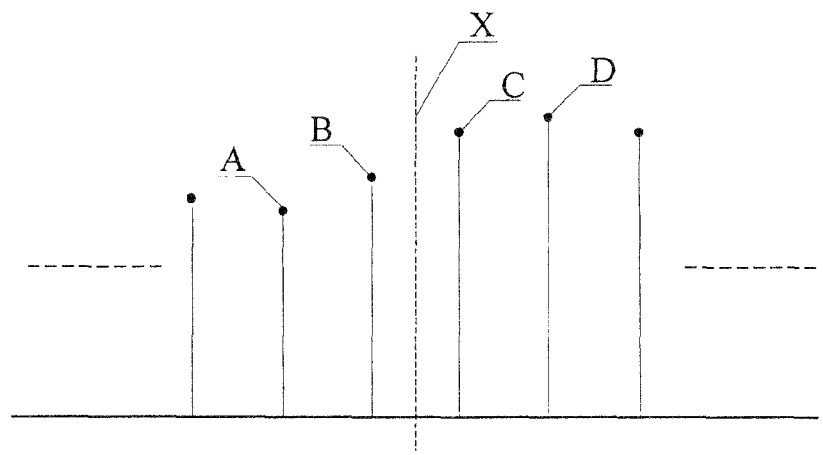
FIG. 3 is a diagram illustrating inspecting the block effect in the example flow chart show in FIG. 2.

In one embodiment, we describe inspecting an intensity vector of the block effect in a row and column direction as shown in FIG. 3. Four points A, B, C, and D represent four adjacent image pixels in one row or one column height A, B, C, and D that represents the amplitude pixel value.

An example rule for discriminating the block effect follows.

$|B-C|>|B-A|$ $|B-C|>|C-D|$ $|B-C|<\text{Threshold\_High}$ $|B-C|>\text{Threshold\_Low}$ Where Threshold_High and Threshold_Low are predetermined upper and lower reference thresholds for determining the block effect. A person of reasonable skill in the art should recognize that the setting of upper and lower reference thresholds may occur manually, automatically, or in any other known manner.

When all four cases are met, there exists a block effect between points B and C. The thresholds avoid incorrectly determining edges or boundaries within image blocks.

Figure 4:
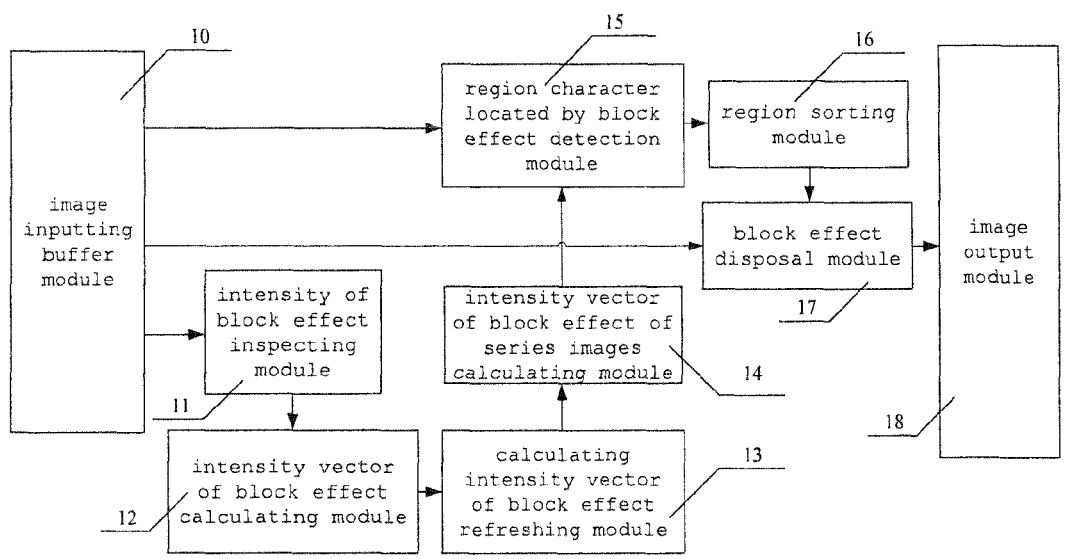
FIG. 4 is a block diagram illustrating an example apparatus for reducing the block effect.

FIG. 4 is a block diagram illustrating an example apparatus for reducing the block effect. Referring to FIG. 4, a block effect intensity inspecting module 11 obtains image data from a buffer 10. Block effect intensity module 11 determines the intensity vector of the block effect by inspecting the image in a row and column direction. The block effect calculating module 12 stores the intensity vector of the block effect determined by module 11. The block effect detection module 15 determines the type or character of the region of the image block while the region sorting module 16 sorts the region as either a smoothing region or a textural region. The block effect disposal module 17 processes the image according to the character of the area, e.g., whether the area is a smoothing or textural region, and according to the intensity vector of the block effect stored in the block effect calculating module 12. After processing, the disposal module 17 stores the resulting image in the image output module 18.

For a series of images, the block effect detection module again determines the type or character of the region using the intensity vector $V_N$ of the block effect from the current frame. The intensity vector refreshing module 13 refreshes the intensity vector of the previous frame $V_{N-1}$ using the intensity vector of the current frame $V_N$. The intensity vector serial image calculating module 14 stores the refreshed result from module 13.

The intensity vector refreshing module 13 refreshes the intensity vector according to $V_N=(1-\alpha)\times V_N+\alpha\times V_{N-1}$, where α is a value between 0 and 1. The larger the value of α, the greater the extent of refreshment. When α=1, the intensity vector of the previous frame processes the entirety of the current frame. This indicates a strong pertinence between the serial images. When α is smaller than 1, there exists a strong pertinence between the serial images, and the intensity vector of the current frame $V_N$ is gradually refreshed to achieve image stability.

Reducing the block effect as we describe above improves image quality for images compressed using standards such as MPEG1, MPEG2, H.261, H.263, H.263+, H.264/MPEG4 AVC, and motion JPEG. Reducing the block effect as we describe above allows for automatic detection of the coding standard without modification, also improving image quality. Finally, reducing the block effect as we describe above may be embodied in various image display equipment, effectively improve image quality, and not only eliminate block effect in the video file compression, but also preserve image details and features that provide a favorable visible impact.

It should be understood that the above embodiments are used only to explain, but not to limit the present. Despite a detailed description that refers to some embodiments, it should be understood that various modifications, changes, or equivalent replacements can be made by those skilled in the art without departing from the spirit and scope of the following claims.

I claim the following:

1. A method for reducing a block effect in video file compression, comprising:
   inspecting an image in a row and column direction, comprising;
      selecting at least four adjacent pixels A, B, C, and D in the image;
      sequentially determining whether the block effect exists between the at least four adjacent pixels A, B, C, and D as follows:

$|B-C|>|B-A|$ $|B-C|>|C-D|$ $|B-C|<\text{Threshold\_High}$ $|B-C|>\text{Threshold\_Low}$ where Threshold_High and Threshold_Low are predetermined upper and lower reference thresholds;
   calculating an intensity vector of the block effect responsive to the inspecting;
   obtaining distribution data for the block effect responsive to the intensity vector; and
   determining position information of the block effect responsive to the distribution data; and
   filtering the image responsive to the intensity vector and the position information.

2. The method of claim 1 comprising:
   determining whether the image includes a single frame.

3. The method of claim 2 comprising
obtaining an intensity vector for a previous frame $V_{N-1}$ responsive to determining that the image does include the single frame;
obtaining an intensity vector of a current frame $V_N$;
refreshing the intensity vector of the previous frame $V_{N-1}$ according to $$V_N=(1-\alpha)\times V_N+\alpha\times V_{N-1}$$

where $\alpha$ is a predetermined refreshing parameter.

4. The method of claim 1 comprising:
determining a position of the block effect in the image;
determining if the block effect is located at a smoothing or textural region of the image responsive to the position of the block effect; and
filtering the image responsive to the determining if the block effect is located at the smoothing or textural region.

5. A method for reducing a block effect in video file compression, comprising:
determining whether the image includes a single frame;
inspecting an image in a row and column direction;
calculating an intensity vector of the block effect responsive to the inspecting;
obtaining an intensity vector for a previous frame $V_{N-1}$ responsive to determining that the image does include the single frame;
obtaining an intensity vector of a current frame $V_N$;
refreshing the intensity vector of the previous frame $V_{N-1}$ according to
$V_N=(1-\alpha)\times V_N+\alpha\times V_{N-1}$ where $\alpha$ is a predetermined refreshing parameter;
obtaining distribution data for the block effect responsive to the intensity vector;
determining position information of the block effect responsive to the distribution data; and
filtering the image responsive to the intensity vector and the position information.

6. The method of claim 5 where inspecting the image in the row and column direction includes:
selecting at least four adjacent pixels A, B, C, and D in the image;
sequentially determining whether the block effect exists between the at least four adjacent pixels A, B, C, and D as follows:

$$|B-C|>|B-A|$$

$$|B-C|>|C-D|$$

$$|B-C|<\text{Threshold\_High}$$

$$|B-C|>\text{Threshold\_Low}$$

where Threshold_High and Threshold_Low are predetermined upper and lower reference thresholds.

7. The method of claim 5 comprising:
determining a position of the block effect in the image;
determining if the block effect is located at a smoothing or textural region of the image responsive to the position of the block effect; and
filtering the image responsive to the determining if the block effect is located at the smoothing or textural region.

* * * * *

UNITED STATES PATENT AND TRADEMARK OFFICE
CERTIFICATE OF CORRECTION

| | | |
|---|---|---|
| PATENT NO. | : 8,121,199 B2 | |
| APPLICATION NO. | : 11/534557 | |
| DATED | : February 21, 2012 | |
| INVENTOR(S) | : Qinghai Wang | |

It is certified that error appears in the above-identified patent and that said Letters Patent is hereby corrected as shown below:

In the Specifications:

On column 1, line 56, the words "...for a block transfbrm Video..." should read
-- ...for a block transform Video... --.

Signed and Sealed this
Thirteenth Day of August, 2013

Teresa Stanek Rea
*Acting Director of the United States Patent and Trademark Office*